UNITED STATES PATENT OFFICE.

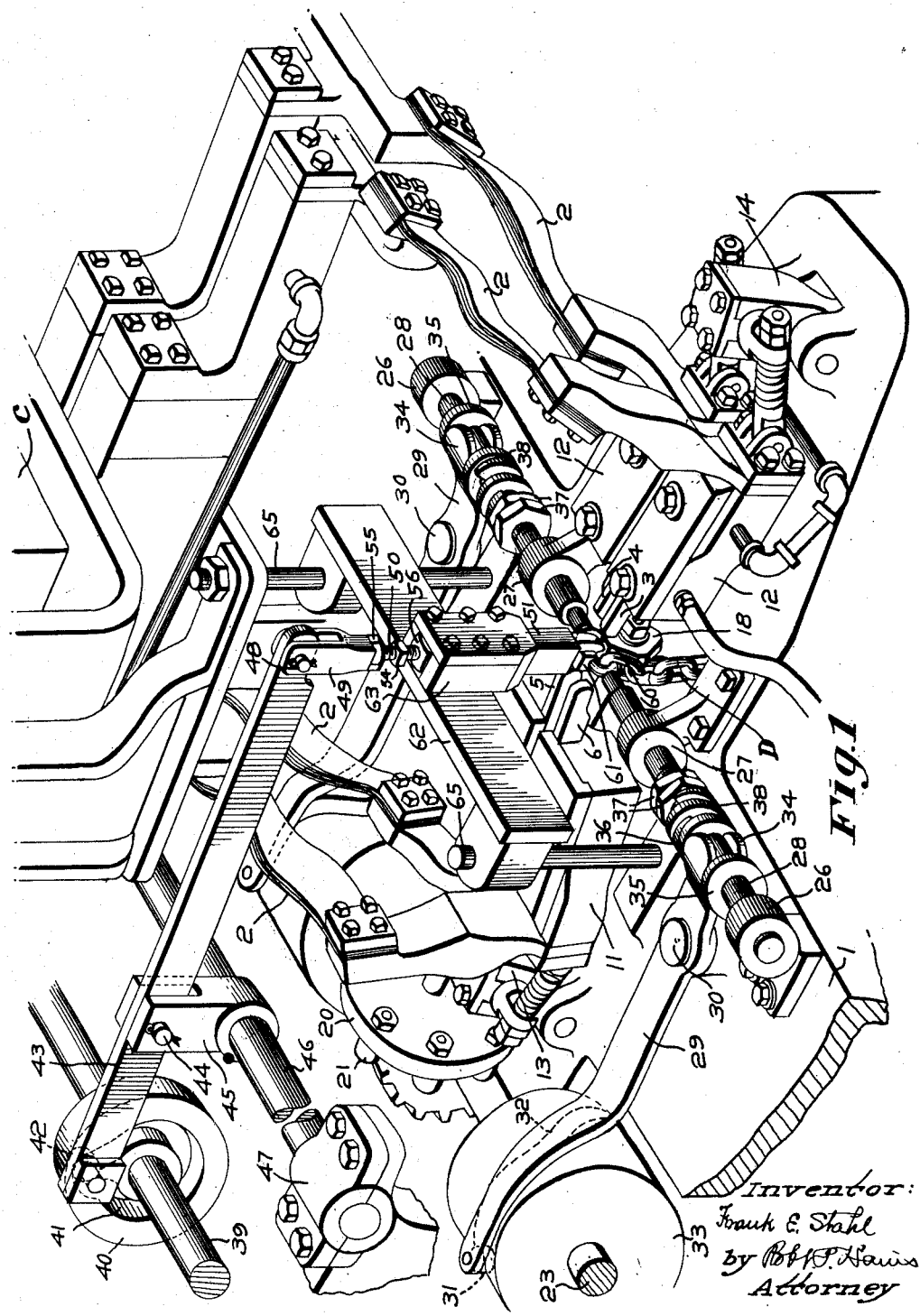

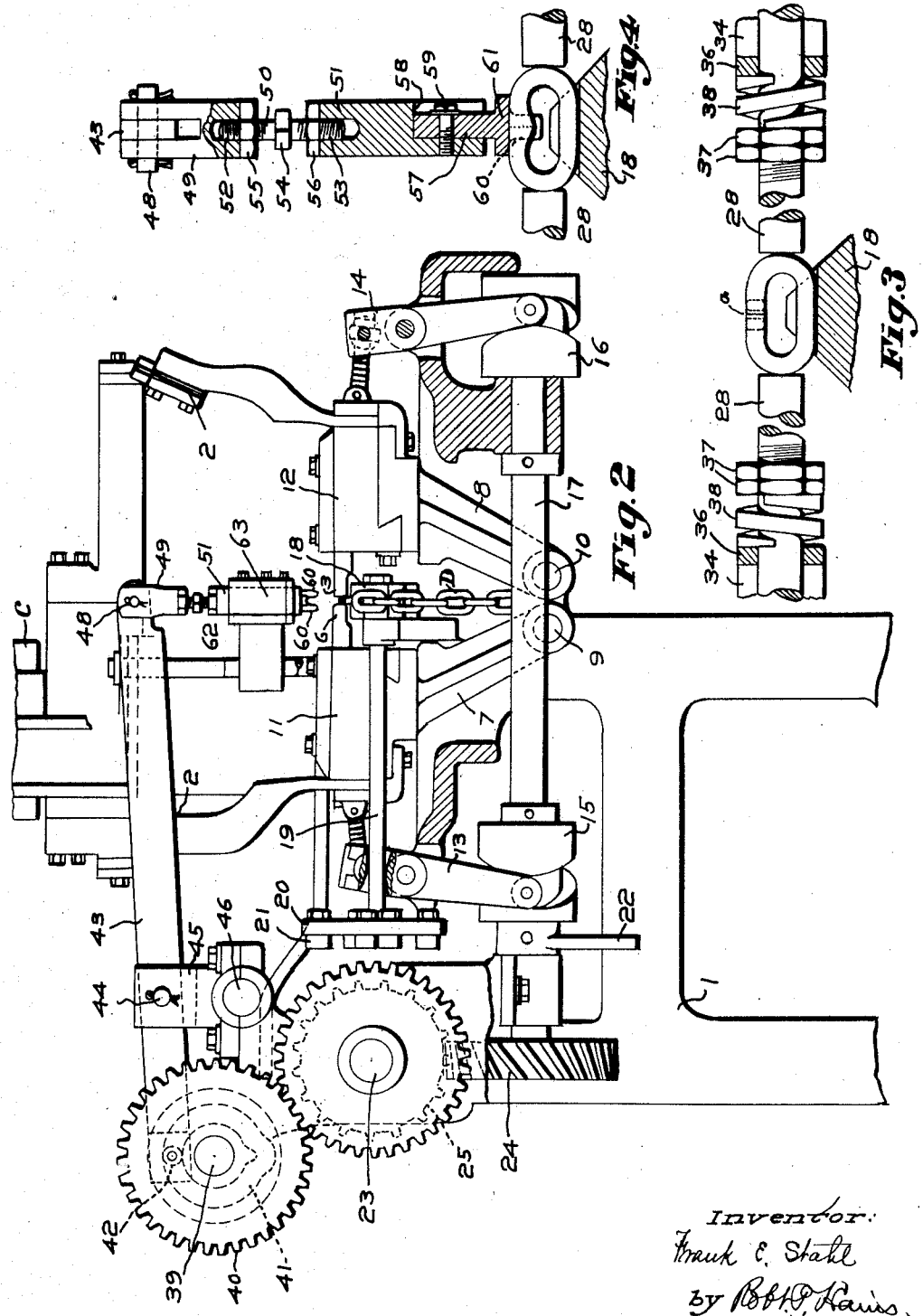

FRANK E. STAHL, OF TONAWANDA, NEW YORK, ASSIGNOR TO THE COLUMBUS-McKINNON CHAIN COMPANY, OF COLUMBUS, OHIO, A CORPORATION OF OHIO.

ELECTRIC-WELDING METHOD, MACHINE, AND WELDED CHAIN.

1,370,926. Specification of Letters Patent. Patented Mar. 8, 1921.

Application filed July 7, 1920. Serial No. 394,493.

*To all whom it may concern:*

Be it known that I, FRANK E. STAHL, a citizen of the United States, residing at Tonawanda, in the county of Erie and State of New York, have invented an Improvement in Electric-Welding Methods, Machines, and Welded Chains, of which the following description, in connection with the accompanying drawings, is a specification, like characters on the drawings representing like parts.

This invention relates to electrically welded chains and a method of and a machine for electrically welding the chain links.

It is now the common practice to form lengths of chain by bending metal links into appropriate form, with the ends of the blank from which the links are made in abutting relation, and then to electrically weld the abutting ends by applying an electric welding heat thereto, and simultaneously subjecting the link to endwise pressure.

The endwise pressure applied to the link during the welding operation has the effect of forming a bulge or enlargement of metal at the welding point. The bulge or enlargement of the link at the welding point, while incidental to the welding operation, is desirable because it imparts to the link at this point an additional strength so that a chain having the links formed as above outlined, when subjected to a breaking strain, does not part at the weld, but pulls out at the ends of the links. On the other hand, the presence of the bulge at the exterior portion of the link, is objectionable in certain uses to which the chain may be put, as for instance, in passing about pulleys, guides, or other directing means, and heretofore it has been customary in some cases to remove the bulge or fin at the exterior portion of the link by cutting or grinding it off, which, of course, weakens the link at the weld.

An important feature of the present invention, therefore, consists in a method of electrically welding the chain links with the formation of the bulge, and preventing the bulge formation at the exterior of the link. In carrying out this feature of the invention, electric welding heat is applied to the ends of the link at opposite sides of the joint, and a limited endwise pressure is imparted to the link sufficient to cause the heated metal at the ends to merge without, however, the formation of the usual bulge; and then the welding heat is interrupted and an additional endwise pressure is imparted to the link to form the bulge and cause it to be confined to the interior portion of the link.

Various means may be employed for carrying out the new method, but the present invention includes, also, a novel machine and combination of mechanical parts well adapted for this purpose.

The welding heat in the machine of the present invention, may be applied to the link or form to be welded by suitable welding electrodes which may be moved to and from engagement with the link or form, and means are provided in the machine of the present invention, for forcing the heated metal to merge or flow at the joint during the application of the welding heat. This action of the force applied to the joint during the application of the welding heat, preferably is not sufficient to form the bulge or fin, at least not to its full extent, and after the electrodes have been withdrawn from contact with the link or form, an additional or further force is applied to the heated metal at the joint of the link to form the bulge and simultaneously prevent its formation on the exterior portion of the link. Thus the metal of the link at the welding point remains of substantially the same mass as where the bulge extends throughout the circumference of the link joint, and consequently, the link joint maintains its desired strength at the weld without the objectionable protuberance or bulge at the exterior portion thereof. The invention also consists of a chain formed of electrically welded links having the bulge at the welded joint of substantially undiminished cross-sectional area and confined to the inner side of the link.

In the drawings:—

Figure 1 is a perspective view of an electric chain welding machine provided with the present invention and adapted for carrying out the improved method;

Fig. 2 is a transverse sectional view, certain parts of the welding machine being omitted;

Fig. 3 is an enlarged detail sectional view, parts broken away, showing the action of the pressers during the application of the welding heat; and Fig. 4 is a view similar to that of Fig. 3, but further showing the action of the pressers after the welding heat has been interrupted and the bulge preventer brought into action.

The electric chain welding machine may be of any usual type, of which there are several now well known, but in the present instance, the invention is shown as associated with an electric chain welding machine of the character shown and described in the patent to George J. Armstrong, No. 1,310,555, dated July 22, 1919.

The machine frame 1 is of suitable character and construction for supporting the operating parts, substantially as described in the patent to Armstrong. Mounted upon a suitable support is the transformer C which, as described in the patent to Armstrong, may be connected by appropriate conductors 2 with the electrodes 3, 4, 5 and 6. The electrodes are mounted upon swinging arms 7 and 8, Fig. 2, which are pivotally supported at 9 and 10 on the machine frame. The electrodes are appropriately secured to carriers 11 and 12, and are moved into and out of engagement with the link of a chain by appropriate means such, for instance, as the arms 13 and 14, pivoted to the machine frame and actuated by the cams 15, 16 on the shaft 17. It will not be necessary to describe the details of the electrode mountings, nor the means for moving them into and out of contact with the link of the chain in detail, because such mechanism is already fully described in the Armstrong patent, to which reference may be had.

The chain D, the links of which are to be welded, is formed from blanks which are bent into the desired form and interlink one with the other, the joint of the break being preferably formed as indicated in the drawings, at one side of the link, although in certain aspects of the invention it might be formed elsewhere. The chain D is fed to successively present links for the welding operation by means of a feed roll or support 18 which is mounted upon the feed shaft 19, the rear end portion of which is provided with a disk 20 having the pins or projections 21 which are engaged at times by the arm 22 mounted upon the shaft 17, the construction being such, as described in the Armstrong patent, that during the operation of the machine, the links of the chain will be presented successively to the welding position, and the electrodes will be periodically moved into and out of engagement with the successive links of the chain at opposite sides of the joint to be welded. In these respects the machine may be as fully described in the Armstrong patent or indeed, of any usual character of chain welding machine.

The shaft 17 is operatively engaged with the back shaft 23, and in the present instance may be geared thereto by the toothed gears 24 and 25, the former of which may be secured to the shaft 17 and the latter to the back shaft 23, substantially as described in the Armstrong patent.

In chain welding machines now in general use, it is usual to apply to the chain link during the application of the welding heat, an endwise pressure to cause the metal at the joint of the link to become thoroughly united or welded together at the same time to produce the usual bur or bulge. In the present invention, however, this condition is modified to the end that during the application of the welding heat, the metal at the joint of the link may be caused to merge or blend, but without the formation of the bulge, and that thereafter, and when the welding electrodes have been removed from engagement with the link, the link shall be given a further endwise compression to form the bur or bulge and simultaneously therewith prevent its formation on the outer portion of the link.

The machine frame 1 has mounted thereon the bearings 26 and 27 in which is mounted for reciprocating movement the pusher 28. There is a pusher 28 at each side of the welding position as indicated in Fig. 1, and a description of one will be sufficient for both. Each of the pushers 28 is given its endwise movement through a lever 29 pivoted at 30 to the machine frame and having a rear end portion 31 which engages a cam path 32 in a cam 33 mounted on the back shaft 23. The other end of each of the levers 29, one being provided for each of the pushers, serves to impart to the pushers under the direction of the cam path 32, suitable movements for giving a preliminary non-bulging pressure to the pushers and thereafter a bulge-forming pressure when the electrodes have been moved out of contact with the link. In the present instance of the invention, the levers 29 are provided with a bifurcated end 34 which engages at opposite sides of the pusher 28 between a collar or disk 35 fixed to the pusher, and another collar or disk 36 loosely mounted upon the pusher. Between the collar 36 and adjustable nuts 37 threaded upon the pusher, as indicated in Fig. 1, is a spring 38, the construction being such that when the levers 29 are actuated by the respective cams on the back shaft, the pushers will be advanced by a yielding motion to engage and press upon the end portions of the link or upon the portions of the link at opposite sides of the joint to be welded.

As hereinbefore indicated, the present invention contemplates that during the application of the welding heat, the link shall be subjected to a limited endwise pressure preferably not sufficient to form the bulge or at least not to form it completely; and the cams 32 for actuating the levers 39 are therefore formd to apply to the pushers a preliminary or limited forward pressing movement under the action of the spring 38 during the application of the welding heat; and after the welding heat has been interrupted or the welding electrodes withdrawn from contact with the link, the respective cams 32 give a further movement to the levers 39 to press the joint of the link firmly together and form the bulge. Since the collar or flange 35 on the respective pushers 28 is fixed or secured to the pushers, it follows that the preliminary movement of the pushers which takes place during the application of the welding heat, is limited, because the pushers 28 can only move under the actuation of their respective springs 38, an amount permitted by the fixed collars or flanges 35 bearing against the outer portions of the bifurcated ends 34 of the levers 29. When, however, the electrodes have been removed from contact with the link, and it is desired to upset the metal and form the bulge, the respective cams 32 impart to the pushers a further movement toward each other.

The preliminary or limited pressure which is imparted to the link during the application of the welding heat is indicated in Fig. 3, wherein it will be noted that the electrodes have raised the metal of the link at each side of the joint at *a* to the welding heat, and that the movement of the pushers 28 has been such only as to cause the metal to flow or merge during the application of the welding heat, without, however, forming the bulge or completing it.

As has hereinbefore been indicated, it is desirable to retain the entire strength of the metal at the welding point without, however, having the bulge appear on the exterior portions of the link; and to this end the present invention contemplates means, such as a bulge preventer, that acts during the final pressure of the pushers upon the link to prevent the formation of the bulge on the exterior portion of the link.

Mounted in suitable bearings on the machine frame is the cam shaft 39, Fig. 1, to which is secured the bulge preventer actuating cam 40 having a cam path 41 on which rides a pin or roller 42 secured to a rocking arm 43. The rocking arm 43 is preferably formed as a lever, and may be conveniently mounted on a fulcrum or pin 44 supported by a yoke 45 rising from an arm 46 supported by the machine frame. In the present instance of the invention, the arm 46 is preferably formed as a shaft or stud which is mounted in bearings 47 secured to the machine frame, only one of such bearings being shown, but it being understood that a similar bearing is provided for the shaft 46 at the opposite side of the machine. The purpose of the shaft 46 and the pin 44 are to afford a fulcrum for the arm 43.

Pivotally connected to the arm 43 at 48, is a link 49 into which is adjustably threaded one end of an adjustable screw connector 50, the other end of which is threaded into the bulge preventer carrier 51. The adjustable screw connection between the yoke 49 and the bulge preventer carrier 51 may conveniently be formed as a right and left-hand screw thread, one portion 52 of which may be threaded to the yoke 49 and the other portion 53 of which may be threaded to the bulge preventer carrier 51 and a non-circular and turning member 54 may be secured to the right and left-hand screw connection for manipulation and adjustment of the parts. When the parts are set up for operation, the connection 50 may be locked in position by the locking bolts 55 and 56, substantially as indicated in Fig. 4. The bulge preventer carrier 51 has detachably connected to its lower portion the bulge preventer 57. Preferably the bulge preventer carrier 51 has a recess 58 in which the upper portion of the bulge preventer 57 is seated, and a screw bolt 59 connects the bulge preventer and the bulge preventer carrier so that different characters of bulge preventers may be applied to the carrier as desired.

The bulge preventer, as indicated in Figs. 1 and 4, has portions which embrace the exterior part of the heated link. In the present instance the bulge preventer has the downwardly-extending side members 60 which are adapted to embrace the sides of the link and an upper member 61 to which the side members are secured or with which they may be formed integral, the construction and shape of the parts being such that when the bulge preventer is in its lowered position as indicated in Fig. 4, the side members or portions 60 thereof will embrace the side portions of the link at the weld, while the upper portion 61 will engage the exterior side portion of the link. The portions 60 and 61 of the bulge preventer may be rounded where they join together to conform to the desired shape of the finished link at the weld. This is sufficiently well illustrated in Fig. 1.

When the bulge preventer is moved into its operative position relative to the link, it is desired that a portion of the bulge preventer shall overlie a relatively cool portion of the link, or that portion of the link more remote from the joint to be welded; and in the present instance of the invention this is provided by extending the upper portion 61 of the bulge preventer laterally, as indicated in Fig. 4, the construction being such that when the bulge preventer is in operative position, the extended portions of the bulge preventer will engage the relatively cooler portions of the link at the opposite sides of the welding joint, and will define the position of the bulge preventer and act as a stop to prevent the bulge preventer from depressing the relatively soft heated metal at the welding point, thereby preserving the desired shape of the link.

From the construction thus far described, it will be apparent that the present invention provides that the welding electrodes may be moved into and out of contact with the links of the chain as they are successively presented at the welding point, and will raise the temperature of the link to the desired degree; and that simultaneously therewith, or during the application of the welding heat, the pushers 28 will impart a preliminary or endwise push to the link to cause the metal at the joint to merge or flow, as indicated in Fig. 3, but without the formation of the bulge or completion of the weld. When the welding electrodes are removed from contact with the link, the bulge preventer is actuated to place it about the exterior portions of the link, as indicated at Fig. 4, and while the joint of the link is at sufficiently high temperature to complete the weld, whereupon the pushers 28 are given a further movement toward each other to form the abutting ends of the link into close yielding engagement, and the formation of the bulge. Owing, however, to the fact that the bulge preventer encircles the link at the weld-forming position, the bulge formed by the pushers is confined to the inner portion of the link and prevented from being formed at the exterior of the link. Thus the welded joint retains the desired strength due to the increased metal bulge, and at the same time, the bulge itself is confined to the inner portion of the link where it is not objectionable. In fact, the bulge at the inner portion of the link may, in some instances, be sufficiently prominent to act as a stud cross member and consequently prevent kinking of the chain when the links are completed.

It may be desirable in some cases to guide the bulge preventer in its movement to and from operative position relative to the kink; and to this end the present invention provides a guide through which the bulge preventer carrier 51 may slide. As indicated in Fig. 1, the machine frame has secured thereto a supporting member or bar 62, Figs. 1 and 2, to which is secured the guide 63. This guide may preferably be formed as a box-like member as indicated in Fig. 1, and have a cap 64 for closing it. The bulge preventer carrier 51 and the guide 63 are preferably non-circular in cross section, so that the bulge preventer shall be accurately presented to the link, when the bulge preventer is moved into operative relation therewith.

The support 62 may be variously formed, but in the present instance it is supported from the machine frame by supporting rods or bolts 65.

In carrying out the invention, the details hereinbefore described form a good, practical embodiment thereof, but it is to be understood that the invention is not restricted to such details, but may be varied within the range of mechanical judgment in the hands of those skilled in the art, because applicant regards himself as the first to provide, in an electric chain welding machine, a bulge preventer which, while permitting the formation of the bulge, shall nevertheless, prevent its formation at the exterior portion of the link, thus retaining the full strength of the link at the weld and the smooth, exterior shape of the link as desired for many purposes.

What is claimed is:—

1. The method of electrically welding the abutting ends of chain links, which consists in applying electrical welding heat to the ends of the link and simultaneously merging the heated ends, interrupting the application of the welding heat, then applying endwise pressure to form the bulge and confining the bulge during its formation to the inner side of the link.

2. The method of electrically welding the abutting ends of chain links, which consists in applying electrical welding heat to the ends of the link, merging the heated ends without the formation of the bulge, interrupting the application of the welding heat, then forming the bulge on the interior of the link during the merging of the heated ends of the link.

3. The method of electrically welding the abutting ends of metal forms, which consists in applying electric welding heat to the abutting ends of the form, causing the metal at the ends of the form to flow together during the application of the electric welding heat, interrupting the welding heat, then forcing the heated ends together and confining the bulge during its formation to the interior of the form.

4. The method of electrically welding the abutting ends of a metal form, which consists in applying electric welding heat to the abutting ends of the form and simultaneously causing the metal at the ends to flow together, interrupting the application of the electric welding heat, then pressing the ends of the form toward each other, and preventing the formation of the resulting bulge at the exterior of the form during the time the ends of the form are being pressed together.

5. The method of electrically welding the abutting ends of chain links, which consists in applying electric welding heat to the abutting ends of the link, simultaneously merging the heated metal at the abutting ends by endwise pressure on the link insufficient to form the bridge, interrupting the application of the electric welding heat, and then subjecting the link to an additional endwise pressure to form the bridge while the metal is hot and confining the bulge during its formation to the interior of the link.

6. In an electric chain welding machine, the combination of welding electrodes, means for moving the electrodes into and out of contact with a link of the chain at opposite sides of the joint to be welded, means for applying pressure lengthwise of the link during contact of the electrodes with the link and an additional pressure when the electrodes are removed from contact with the link, and means for preventing the formation of a bulge at the exterior of the link during the application of the additional pressure.

7. In an electric chain welding machine, the combination of welding electrodes, means for moving the electrodes into and out of engagement with a link of chain at the sides of the joint to be welded, pressers for forcing the abutting ends of the link joint together, means for causing the pressers to exert a limited pressure upon the joint during the application of the welding heat and an additional pressure after the electrodes have been removed from engagement with the link, and means acting during the application of the additional pressure for preventing the formation of the bulge at the exterior portion of the link.

8. In an electric chain welding machine, the combination of welding electrodes, means for moving the electrodes into and out of engagement with a link of chain at the sides of the joint to be welded, pressers for forcing the abutting ends of the link joint together, means for causing the pressers to exert a limited yielding pressure upon the joint during the application of the welding heat and an additional pressure after the electrodes have been removed from engagement with the link, and means acting during the application of the additional pressure for preventing the formation of the bulge at the exterior portion of the link.

9. In an electric chain welding machine, the combination of welding electrodes, means for moving them into and out of contact with a chain link at opposite sides of the joint to be welded, pressers for forcing the ends of the link toward each other, means acting during contact of the electrodes with the link for causing the pressers to exert a force upon the heated joint sufficient to merge the heated metal at the joint without forming a bulge and acting after the disengagement of the electrodes to cause the pressers to exert a force upon the heated joint to weld the metal and form a bulge, and means for preventing the formation of the bulge at the exterior of the link.

10. In a machine of the class described, the combination of electrodes, means for moving the electrodes into and out of contact with the metal form to be welded, means for forcing the metal to merge or blend during the application of the welding heat without the formation of a bulge and for forcing the heated metal together with the formation of a bulge after the electrodes have been disengaged from the metal, and a bulge preventer acting during the formation of the bulge to prevent the formation of the bulge on the exterior of the form.

11. In an electric chain welding machine, the combination of electrodes, means for moving them into and out of engagement with the link of a chain to be welded, pressers for acting on the link at opposite sides of the joint, means for forcing the pressers toward each other a limited amount during the contact of the electrodes with the link and an additional amount after the electrodes have been removed from contact with the link, and a bulge preventer adapted to embrace the exterior portion of the link at the joint to prevent the formation of the bulge on the exterior of the link.

12. In an electric chain welding machine, the combination of electrodes, means for moving them into and out of engagement with the link of a chain to be welded, pressers for acting on the link at opposite sides of the joint, means for forcing the pressers toward each other a limited amount during the contact of the electrodes with the link and an additional amount after the electrodes have been removed from contact with the link, a bulge preventer comprising a member which embraces the exterior of the link at the joint, and means for moving the bulge preventer into engagement with the link after the electrodes have been withdrawn from contact with the link to prevent the bulge on the exterior of the link.

13. In a machine for electrically welding chain links, the combination of welding electrodes and pushers, a bulge preventer which is constructed and arranged to embrace the exterior portion of the link at the joint, means for operating the electrodes and pushers to heat the metal and cause it to merge and to then withdraw the electrodes and give additional movement to the pushers to upset the metal and form a bulge, and means for causing the bulge preventer to contact with the heated link after the electrodes have been withdrawn and during the upsetting action of the pushers to prevent the formation of the bulge on the exterior of the link.

14. In a machine for welding chain links, the combination of welding electrodes and pushers, a bulge preventer having a link engaging portion which is adapted to embrace the exterior of the link at the heated joint to be welded and a portion adapted to engage the relatively unheated portion of the link, and means for causing the bulge preventer to engage the link after the electrodes have been withdrawn to prevent the formation of the bulge on the exterior of the link.

15. In a machine for welding chain links, the combination of welding electrodes and pushers, a bulge preventer having a link engaging portion which is adapted to embrace the exterior of the link at the heated joint to be welded and a portion adapted to engage the relatively unheated portion of the link, means for causing the bulge preventer to engage the link after the electrodes have been withdrawn to prevent the formation of the bulge on the exterior of the link, and means for adjusting the bulge preventer.

16. In a machine of the class described, a bulge preventer comprising a portion for embracing the exterior of a chain link at the heated joint to be welded and another portion adapted to engage the relatively cold part of the link beyond the heated joint and by such engagement to limit the movement of the bulge preventer toward the joint, and means for moving the bulge preventer into and out of engagement with the chain link to prevent the formation of the bulge on the exterior of the link.

17. In an electric chain welding machine, the combination of welding electrodes and pushers, means for operating them, a bulge preventer comprising a link joint embracing member, means for moving the embracing member into engagement with the heated link when the welding electrodes are removed from contact with the link to prevent formation of a bulge on the exterior of the link, and means for detachably connecting the bulge preventer to its moving means to permit the substitution of one bulge preventer for another.

18. In a machine for electrically welding chain links, the combination of welding electrodes and means for forcing the heated metal at the joint into welding union, a bulge preventer for embracing portions of the exterior of the link at the joint to prevent the formation of the bulge on the exterior of the link after the electrodes have been withdrawn, and while the heated metal is being forced into welded union, a cam, an arm actuated by the cam, and connections between the bulge preventer and arm for operating the bulge preventer.

19. A chain formed of electrically welded links in which the enlargement or bulge formed during welding is maintained with substantially undiminished cross sectional area at the welded joint and is confined to the inner side of the link.

20. A chain formed of links having electrically welded abutting joints and in which the enlargement or bulge formed during welding is located in its entirety upon the inner side of the links.

21. A chain formed of links having electrically welded abutting joints, and having the bulge or enlargement produced during the welding operation and incidental thereto, formed only upon the inner surface of the link and with the total amount of metal that is laterally displaced during the welding operation practically undiminished.

22. A chain formed of elongated electrically welded links having the welded joint formed in one of the side members of the links, said welded side member of each link having its outer surface smooth at the weld and free from a bulge or enlargement, and said side member having the bulge or enlargement formed during the welding operation located in its entirety upon the inner face thereof.

23. A chain formed of electrically welded links, each link having the bulge or enlargement which is formed at the weld and incidental to the welding operation displaced from the outer face of the link to form a bulge or enlargement of substantially undiminished area upon the inner face of the link.

24. A chain formed of electrically welded links, each link having the bulge or enlargement which is formed at the weld and incidental to the welding operation displaced from the outer face of the link to form a bulge or enlargement upon the inner face of the link containing the displaced metal.

In testimony whereof I have signed my name to this specification.

FRANK E. STAHL.